(12) United States Patent
Gasmi

(10) Patent No.: US 12,031,843 B2
(45) Date of Patent: *Jul. 9, 2024

(54) METHOD FOR DETERMINING A DISTANCE USING A LASER RANGE FINDER

(71) Applicant: KING FAHD UNIVERSITY OF PETROLEUM AND MINERALS, Dhahran (SA)

(72) Inventor: Khaled Gasmi, Dhahran (SA)

(73) Assignee: KING FAHD UNIVERSITY OF PETROLEUM AND MINERALS, Dhahran (SA)

(*) Notice: Subject to any disclaimer, the term of this patent is extended or adjusted under 35 U.S.C. 154(b) by 43 days.

This patent is subject to a terminal disclaimer.

(21) Appl. No.: 18/056,510

(22) Filed: Nov. 17, 2022

(65) Prior Publication Data

US 2023/0324171 A1 Oct. 12, 2023

Related U.S. Application Data

(63) Continuation of application No. 17/714,382, filed on Apr. 6, 2022, now Pat. No. 11,519,723.

(51) Int. Cl.
*G01C 3/08* (2006.01)
*G01C 3/04* (2006.01)
(Continued)

(52) U.S. Cl.
CPC .............. *G01C 3/08* (2013.01); *G01C 3/04* (2013.01); *G01S 7/484* (2013.01); *G01S 7/4861* (2013.01);
(Continued)

(58) Field of Classification Search
CPC .. G01C 3/08; G01C 3/04; G01S 7/484; G01S 7/4861; G01S 7/61; G01S 17/10;
(Continued)

(56) References Cited

U.S. PATENT DOCUMENTS 5,552,878 A 9/1996 Dillard
5,926,259 A 7/1999 Bamberger et al.
(Continued)

FOREIGN PATENT DOCUMENTS

CA 28333435 11/2012
CN 110308456 B 5/2021
(Continued)

OTHER PUBLICATIONS

Chee Loh, et al., "Time-of-Flight Rangefinder", ECE 445, Design Review, https://courses.engr.illinois.edu/ece445/getfile.asp?id=5276, Team 28, Feb. 22, 2012, pp. 1-22.
Khaled Gasmi, "A simple and reliable counting and display circuit for laser rangefinder", Optical Sensors, Proceedings of SPIE Optics + Optoelectronics, vol. 11772, Apr. 18, 2021, 7 pages.

*Primary Examiner* — Mark Hellner
(74) *Attorney, Agent, or Firm* — Oblon, McClelland, Maier & Neustadt, L.L.P.

(57) ABSTRACT

A digital counting and display system and methods for use with a laser rangefinder that counts backscattered laser beams and displays a distance between a laser and a target. The laser rangefinder includes a laser configured to emit a pulsed laser beam, an afocal Gallilean telescope configured to receive backscattered laser pulses and generate a series of focused backscattered laser pulses, a silicon avalanche photodetector connected to the afocal Gallilean telescope, configured to generate a series of currents signal proportional to the series of focused backscattered laser pulses, a low noise, multistage amplifier connected to the silicon avalanche photodetector, configured to generate a series of linearly changing amplified voltage signals from the series of current signals, an analog-to-digital converter configured to convert the series of linearly changing amplified voltage signals to a series of digital voltage signals, and a digital counting and display circuit connected to the analog-digital converter.

11 Claims, 8 Drawing Sheets

(51) Int. Cl.
  *G01S 7/484*  (2006.01)
  *G01S 7/4861*  (2020.01)
  *G01S 7/51*  (2006.01)
  *G01S 17/10*  (2020.01)
  *G02B 7/10*  (2021.01)
  *G02B 23/00*  (2006.01)
  *H01S 3/16*  (2006.01)

(52) U.S. Cl.
  CPC ................ *G01S 7/51* (2013.01); *G01S 17/10* (2013.01); *G02B 7/10* (2013.01); *G02B 23/00* (2013.01); *H01S 3/1643* (2013.01); *H01S 3/1691* (2013.01)

(58) Field of Classification Search
  CPC ......... G02B 7/10; G02B 23/00; H01S 3/1643; H01S 3/1691
  See application file for complete search history.

(56) References Cited

U.S. PATENT DOCUMENTS

| | | |
|---|---|---|
| 6,829,043 B2 | 12/2004 | Lewis |
| 11,519,723 B1 * | 12/2022 | Gasmi ................... G01S 7/4816 |
| 2012/0044476 A1 | 2/2012 | Earhart et al. |
| 2019/0086523 A1 | 3/2019 | Liem et al. |
| 2022/0099813 A1 | 3/2022 | Gates |

FOREIGN PATENT DOCUMENTS

| | | |
|---|---|---|
| EP | 2605034 A1 | 6/2013 |
| RU | 2464601 C1 | 10/2012 |
| WO | WO 00/08512 A1 | 2/2000 |
| WO | WO 2022039871 A1 | 2/2022 |

* cited by examiner

METHOD FOR DETERMINING A DISTANCE USING A LASER RANGE FINDER

CROSS-REFERENCE TO RELATED APPLICATIONS

The present application is a Continuation of U.S. application Ser. No. 17/714,382, now allowed, having a filing date of Apr. 6, 2022.

STATEMENT REGARDING PRIOR DISCLOSURE BY THE INVENTORS

Aspects of this technology are described in a public presentation, "A Simple and Reliable Counting and Display Circuit for Laser Rangefinder", Proc. SPIE 11772, Optical Sensors 2021, 1177219, Apr. 18, 2021, incorporated herein by reference in its entirety.

BACKGROUND

Technical Field

The present disclosure is directed to a digital counting and display system and methods for a long distance laser rangefinder.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

A laser rangefinder is used to accurately measure distances to a target ranging from a few millimeters to several kilometers without any physical contact with the target. The laser rangefinder takes advantage of the properties of laser sources, such as monochromaticity, beam collimation and high power emission. Laser beam collimation and high power emission allow the measurement of a distance to a very remote target, while monochromaticity permits narrow bandwidth detection. The laser rangefinder has many applications in different fields, such as unmanned aerial vehicles, geodesy and cartography, architectural surveying, observation devices, sensors systems, autonomous vehicles, and mobile robotics. The laser rangefinder is based on a direct time-of-flight (TOF) measurement method, which is a simple and straightforward method. Conventional laser rangefinders send a laser pulse towards a target, and receive the pulse as reflected from the target. An internal clock of the laser rangefinder monitors a time difference between the transmitted and received pulses. From the elapsed time $\Delta t$ between emission and reception of the pulses, the distance d to the target is determined with high accuracy and precision according to the equation $d = c * \Delta t / 2$, where c is the speed of light. The elapsed time can be measured using a digital or analog method. The analog method is based on charging or discharging a capacitor during the time between an emitted and received pulses. However, the analog method is complex as compared with the digital method. The digital method, which is characterized by its high linearity, is based on counting the number of clock pulses passing to a counting unit between the emitted and received pulses. The counting unit counts the integer number of clock pulses passed during the time interval between transmission of a ranging pulse and reception of the reflected pulse. The counting unit begins counting at the first clock pulse after the ranging pulse is transmitted and stops counting after the reflected pulse is received. The total integer number of clock pulses counted during the time interval is a function of the measured range to the target. However, the true range is almost always different from the measured range as there may be an error between the measured range and the true range depending on the synchronization of the clock pulses with the transmission and reception of the ranging pulse.

Further, the intensity of the reflected (backscattered) pulse depends on various parameters, such as the power of the emitted laser pulse, emission wavelength, divergence of the laser beam, atmospheric conditions, reflectivity of the target, and proximity or remoteness of the laser rangefinder.

Generally, in laser range finding, pulsed lasers emit pulses at the wavelength 1.06 µm as this emission wavelength is within the near-infrared (NIR) atmospheric transmission window (0.7-1.5 µm). At this wavelength, the laser pulses are invisible and may damage the eyes, therefore proper safety precautions must be taken when the laser rangefinder is operated.

Conventional laser rangefinders also suffer from a systematic timing walk error. Time walk error refers to varying the amplitude of a reflected signal or echo as a function of a target distance R, reflectivity and orientation of a target. Many techniques have been employed to overcome such issues, for example, leading edge timing (constant amplitude), zero crossing timing (derivation), first moment timing (integration), and constant fraction timing (constant fraction discrimination CFD). However, these techniques have been prone to inaccuracy.

Hence, there is a need for a counting and display circuit for a laser rangefinder which can provide an accurate measurement of a target.

SUMMARY

In an exemplary embodiment, a digital counting and display system for a laser rangefinder is described. The system includes a laser configured to emit a pulsed laser beam, an afocal Gallilean telescope configured to receive backscattered laser pulses and generate a series of focused backscattered laser pulses, a silicon avalanche photodetector connected to the afocal Gallilean telescope, wherein the silicon avalanche photodetector is configured to generate a series of current signals proportional to the series of focused backscattered laser pulses, a low noise, multistage amplifier connected to the silicon avalanche photodetector, wherein the multistage amplifier is configured to generate a series of linearly changing amplified voltage signals from the series of current signals, an analog-to-digital, A/D, converter connected to the low noise, multistage amplifier, wherein the A/D converter is configured to convert the series of linearly changing amplified voltage signals to a series of digital voltage signals, and a digital counting and display circuit connected to the analog-digital converter, wherein the digital counting and display circuit is configured to count each of the digital voltage signals, generate a total count and display the total count on a display.

In another exemplary embodiment, a method of using a counting and display system with a laser rangefinder is described. The method includes emitting, with a pulsed laser, a pulsed laser beam, directing, with a beam splitter, a first portion of the pulsed laser beam towards a target, receiving, with an afocal Gallilean telescope, a series of backscattered laser pulses reflected from the target, generating, with the afocal Gallilean telescope, a series of focused backscattered laser pulses, receiving, with a silicon avalanche photodetector connected to the afocal Gallilean telescope, the series of focused backscattered laser pulses, generating, by the silicon avalanche photodetector, a series of current signals proportional to the series of focused backscattered laser pulses, receiving, by a low noise, multistage amplifier connected to the silicon avalanche photodetector, the series of current signals, generating, by the low noise, multistage amplifier, a series of linearly changing amplified voltage signals, receiving, with an analog-to-digital, A/D, converter connected to the low noise, multistage amplifier, the series of linearly changing amplified voltage signals, generating, with the A/D converter, a series of digital voltage signals, receiving, by a digital counting circuit connected to the analog-digital converter, the series of digital voltage signals, directing, with the beam splitter, a second portion of the pulsed laser beam towards a high speed silicon photodiode configured to convert the second portion to a second portion pulsed current signal, converting, with an analog to transistor-transistor logic, TTL, converter circuit, the second portion pulsed current signal to a pulsed TTL signal, receiving, by a digital gate of the digital counting circuit, the pulsed TTL signal, incrementing a counter of the digital counting circuit, determining, by the digital counting circuit, a time difference between receiving the digital voltage signal and receiving the pulsed TTL signal, calculating a distance between the laser and the target based on the time difference and a counter total, and displaying the distance between the laser and the target on a digital display connected to the digital gate.

In another exemplary embodiment, a non-transitory computer readable medium having instructions stored therein that, when executed by one or more processors, cause the one or more processors to perform a method of using a counting and display circuit with a laser rangefinder is described. The method includes emitting, with a pulsed laser, a pulsed laser beam, directing, with a beam splitter, a first portion of the pulsed laser beam towards a target, receiving, with an afocal Gallilean telescope, a series of backscattered laser pulses reflected from the target, generating, with the afocal Gallilean telescope, a series of focused backscattered laser pulses, receiving, with a silicon avalanche photodetector connected to the afocal Gallilean telescope, the series of focused backscattered laser pulses, generating, by the silicon avalanche photodetector, a series of current signals proportional to the series of focused backscattered laser pulses, receiving, by a low noise, multistage amplifier connected to the silicon avalanche photodetector, the series of current signals, generating, by the low noise, multistage amplifier, a series of linearly changing amplified voltage signals, receiving, with an analog-to-digital, A/D, converter connected to the low noise, multistage amplifier, the series of linearly changing amplified voltage signals, generating, with the A/D converter, a series of digital voltage signals, receiving, by a digital counting circuit connected to the analog-digital converter, the series of digital voltage signals, directing, with the beam splitter, a second portion of the pulsed laser beam towards a high speed silicon photodiode configured to convert the second portion to a second portion pulsed current signal, converting, with an analog to transistor-transistor logic, TTL, converter circuit, the second portion pulsed current signal to a pulsed TTL signal, receiving, by a digital gate of the digital counting circuit, the pulsed TTL signal, incrementing a counter of the digital counting circuit, determining, by the digital counting circuit, a time difference between receiving the digital voltage signal and receiving the pulsed TTL signal, calculating a distance between the laser and the target based on the time difference and a counter total, and displaying the distance between the laser and the target on a digital display connected to the digital gate.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
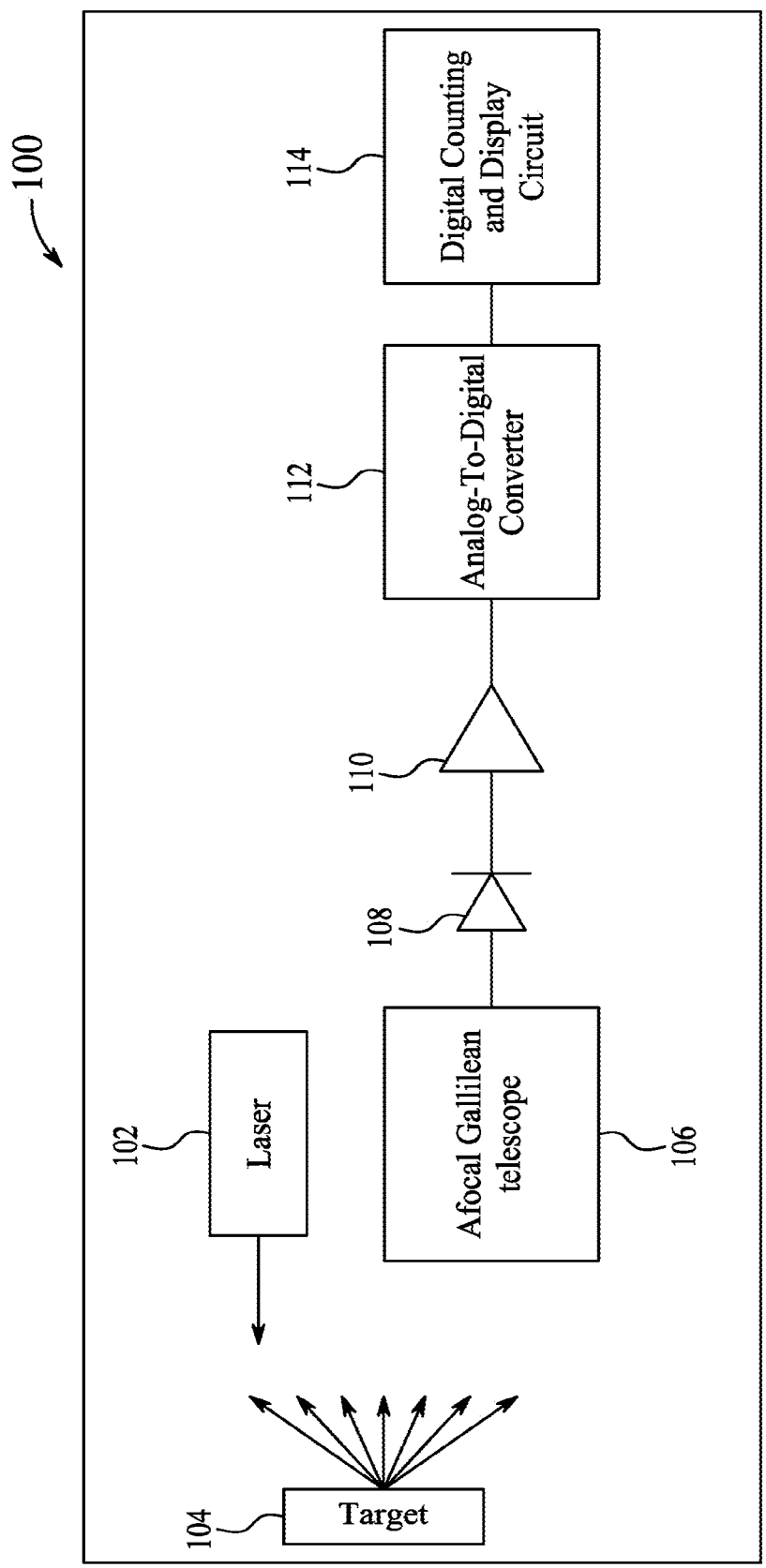
FIG. 1 illustrates a block diagram of a laser rangefinder, according to aspects of the present disclosure.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a digital counting and display system for a laser rangefinder and a method of using digital counting and display circuit with a laser rangefinder to measure a distance to a target. The laser rangefinder is configured to use a pulsed Nd:YAG laser, which emits pulses in a near-infrared spectral region at a wavelength of 1.06 μm. The laser rangefinder is configured to measure a distance to a target with a resolution of at least 5 m, an accuracy of at least 1.5 m, and a maximum range of 15 km based on a direct time-of-flight (TOF) method. The detection of the target is achieved with a probability of detection of 0.99, and a probability of false alarm is $1.5 \times 10^{-7}$.

The digital counting and display system is characterized by its simplicity, versatility, and reliability. The digital counting and display system is configured to be placed at the end of an optoelectronic detection circuit formed by a silicon avalanche photodiode, a multistage amplifier, and an analog-to-digital converter. In existing laser rangefinders, cross walk error happens due to laser pulse amplitude variation that causes an error in the estimated TOF.

The digital counting and display system is a digital approach to a time-to-digital converter (TDC) where the cross walk error is reduced by using an amplification circuit with a variable gain after a silicon avalanche photodetector instead of using complicated techniques to compensate for systematic timing walk error.

In various aspects of the disclosure, non-limiting definitions of one or more terms that will be used in the document are provided below.

A "D (or Delay) Flip Flop" is a digital electronic circuit used to delay the change of state of its output signal (Q) until the next rising edge of a clock timing input signal occurs.

FIG. 1 illustrates a block diagram of a digital counting and display system for a laser rangefinder used with a laser rangefinder 100 for measuring the distance to/from a target 104, according to one or more aspects of the present disclosure. Referring to FIG. 1, the laser rangefinder 100 includes a laser 102, an afocal Gallilean telescope 106, a silicon avalanche photodetector 108, a low noise multistage amplifier 110, an analog-to-digital (A/D) converter 112, and a digital counting and display circuit 114. Collectively, the silicon avalanche photodetector 108, the low noise multistage amplifier 110, the A/D converter 112 are known as the optoelectronic detection circuit.

The laser 102 is configured to emit the pulsed laser beam towards the target 104. The pulsed laser beam is reflected from the surface of the target 104. The laser rangefinder 100 calculates the time taken by the pulsed laser beam to be reflected by the target 104 and returned to the afocal Gallilean telescope 106 (also known as receiver telescope).

The laser 102 may be selected from a group including a feedback laser, a non-feedback laser, an Nd:YAG laser, a $CO_2$ laser, a $Nd:YVO_4$ laser, and a green laser. The laser 102 (including transmitting optics) includes, inter alia, a neodymium-doped yttrium aluminum garnet (Nd:YAG) laser, an optical attenuator, a Gallilean beam expander, a collimator, and a diffuser (explained in detail in FIG. 4). The Nd:YAG laser is configured to generate the pulsed laser beam in the near-infrared spectral region at the wavelength of 1.06 μm. The Nd:YAG laser is configured to emit the pulsed laser beam with, for example, an energy per pulse of 50 mJ, a repetition rate of 10 Hz, a full width at half maximum of 7 ns, and a pulse rise time of ~2.5 ns.

In an exemplary operation, the afocal Gallilean telescope 106 is configured to receive backscattered laser pulses reflected from the target 104. The afocal Gallilean telescope 106 generates a series of focused backscattered laser pulses using the received backscattered laser pulses. In an example, the laser 102 and the afocal Gallilean telescope 106 are mounted in a same plane in a monostatic biaxial configuration.

The silicon avalanche photodetector 108 coupled to the afocal Gallilean telescope 106 receives the series of focused backscattered laser pulses from the afocal Gallilean telescope 106.

The silicon avalanche photodetector 108 may be a silicon avalanche photodiode. The silicon avalanche photodetector 108 (hereinafter interchangeably referred to as the silicon avalanche photodiode 108) generates a series of current signals proportional to the received series of focused backscattered laser pulses. In an aspect, the silicon avalanche photodiode 108 may be configured to provide an enhanced response of 34 A/W at $\lambda=1.06$ μm, an active diameter of 0.8 mm, an internal gain of 100, and a cutoff frequency of 400 MHz. The silicon avalanche photodiode 108 may be biased in a breakdown region at 390 V using a controlled stabilized high-voltage power supply. In an example, the laser rangefinder 100 may employ a semiconductor avalanche photodiode selected from a group of semiconductor materials including Gallium arsenide (GaAs), Gallium-Aluminium-Arsenide GaAlAs and Gallium Indium Phosphide (GaInP), and Aluminium gallium indium phosphide (AlGaInP).

The low noise multistage amplifier 110 is connected to the silicon avalanche photodiode 108. The low noise multistage amplifier 110 is configured to receive the series of current signals from the silicon avalanche photodiode 108 and generate a series of linearly changing amplified voltage signals from the series of current signals. In an example, the low noise multistage amplifier 110 includes a low noise preamplifier (LNP) and a variable gain amplifier (VGA). In an example, the LNP is configured to have a fixed gain. In an example, the fixed gain of low noise preamplifier is 20 dB. The VGA is configured to provide a variable gain based on the applied control voltage (CV). In an example, the gain of the VGA may be selected between 0-60 dB. In an example, the laser rangefinder 100 includes a DC offset correction circuit (not shown) located within the LNP. The DC offset correction circuit is configured to remove distortions in the current signals.

In an example, the low noise multistage amplifier 110 has a bandwidth of 300 MHz and an input voltage noise spectral density of 1.0 $nV/Hz^{1/2}$. The low noise multistage amplifier 110 achieves a maximum dynamic range of about five decades (105), thereby resolving small and strong laser backscattered signals. The LNP with the DC offset correction circuit is configured to optimize the performance of the silicon avalanche photodiode 108 to achieve amplification without distortion of fast and weak electrical signals. The LNP converts the series of current signals generated by the silicon avalanche photodiode 108 to a suitable voltage signal with high fidelity. The LNP may amplify, without distortion, the electrical signals of 7 ns full width at half maximum (FWHM) and a rise time of 2.5 ns. The low noise level of the silicon avalanche photodiode 108 and the low noise multistage amplifier 110 improves the detection sensitivity and therefore increases the maximum range of the laser rangefinder 100, while the high speed of the silicon avalanche photodiode 108 and the low noise multistage amplifier 110 enhances the resolution of the laser rangefinder 100.

The A/D converter 112 is connected to the low noise multistage amplifier 110. The A/D converter 112 is configured to receive the series of linearly changing amplified voltage signals from the low noise multistage amplifier 110 and convert the series of linearly changing amplified voltage signals to a series of digital voltage signals. In an example, the A/D converter 112 includes a high frequency Schmitt trigger circuit (Schmitt trigger circuit 300 shown in FIG. 3). The Schmitt trigger circuit receives the series of linearly changing amplified voltage signals and generates the series of digital voltage signals. The series of digital voltage signals generated by the Schmitt trigger circuit is compatible with a subsequent unit such as the digital counting and display circuit 114. The series of digital voltage signals generated by the Schmitt trigger circuit match the transistor-transistor logic (TTL) input levels.

The digital counting and display circuit 114 is connected to the A/D converter 112 and receives each of the digital voltage signals. The digital counting and display circuit 114 is configured to receive a pulsed TTL signal from a converter circuit (shown in FIG. 3). The digital counting and display circuit 114 determines a time difference between receiving the digital voltage signal and receiving the pulsed TTL signal. Based at least in part on the time difference, the digital counting and display circuit 114 is configured to generate a total count and display the total count on the display.

The laser rangefinder 100 is enclosed within a weatherproof housing. In some examples, the weatherproof housing may be made of plastic or metal.

Figure 2:
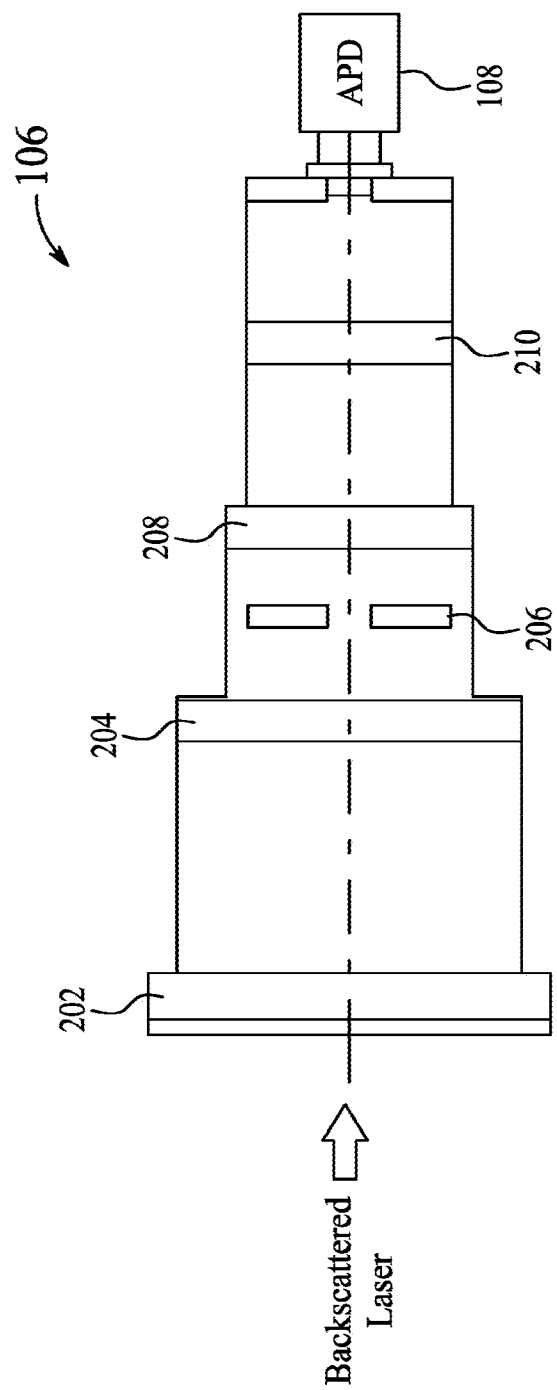
FIG. 2 illustrates a block diagram of an afocal Gallilean telescope, according to aspects of the present disclosure.

FIG. 2 illustrates a block diagram of the afocal Gallilean telescope 106, according to aspects of the present disclosure. The afocal Gallilean telescope 106 is configured to collect the backscattered laser signals reflected from the target 104 and to generate a focused backscattered laser signal. The afocal Gallilean telescope 106 directs the series of focused backscattered laser signals onto an active area of the silicon avalanche photodiode 108. The afocal Gallilean telescope 106 includes an achromatic convergent lens 202 (objective lens), a divergent lens 204, an adjustable iris 206, an interference filter 208, and a biconvex lens 210.

The achromatic convergent lens 202 is configured to gather the backscattered laser signals from the target 104. The achromatic convergent lens 202 may include two or three lens elements. The achromatic convergent lens 202 offers significantly better performance than singlet lenses. When the backscattered laser signal (light rays) falls on the achromatic convergent lens 202, and said signal is parallel to a main axis of the achromatic convergent lens 202, the achromatic convergent lens 202 is configured to concentrate or converge said signals (light rays) to a single point (at the focus). The achromatic convergent lens 202 having multi-lenses element design offers a number of advantages, such as reduced chromatic aberration, improved imaging of monochromatic light, and improved off-axis performance. In an example, the achromatic convergent lens 202 has a diameter (D) of 40 mm, and a focal length (FL) of 80 mm.

The divergent lens 204 is configured to form two parallel rays of light. When the light rays pass through the divergent lens 204, these rays do not converge at any point. Depending on the curvature of the divergent lens 204, the rays are configured to diverge to a greater or lesser extent. In an example, the divergent lens shape is a biconvex, plano-convex, or crescent convex lens, leading to a greater divergence. In an example, the divergent lens 204 has a diameter (D) 22.4 mm, and a focal length (FL) of −20 mm.

The adjustable iris 206 is located in a focal plane of the afocal Gallilean telescope 106. The adjustable iris 206 is configured to correct the divergence of each of the series of pulsed laser beams. The adjustable iris 206 is also configured to adjust an emitter telescope field of view (FOV) to match the emitted laser beam divergence. In an example implementation, the adjustable iris 206 (spatial filtering) is placed in a focal plane of the afocal Gallilean telescope 106. The adjustable iris 206 is used to control overlap between the laser beam FOV (laser diameter) and FOV of the afocal Gallilean telescope 106, therefore determining a minimum detection range. The FOV of the afocal Galliean telescope 106 of the laser rangefinder contains the laser beam.

The interference filter 208 is configured to filter out ambient light. In an example, the interference filter 208 is centered at λ=1.06±0.002 μm is used to filter out the daylight.

The biconvex lens 210 (focusing lens) is configured to focus each backscattered laser signals on the silicon avalanche photodiode (APD) 108. In an example, the biconvex lens 210 has a diameter (D) of 30 mm.

In an example, an additional telescope (not shown) may be integrated into the afocal Gallilean telescope 106. The additional telescope may be configured to provide magnification of about eight times the magnification distance for reducing an aiming error.

Figure 3:
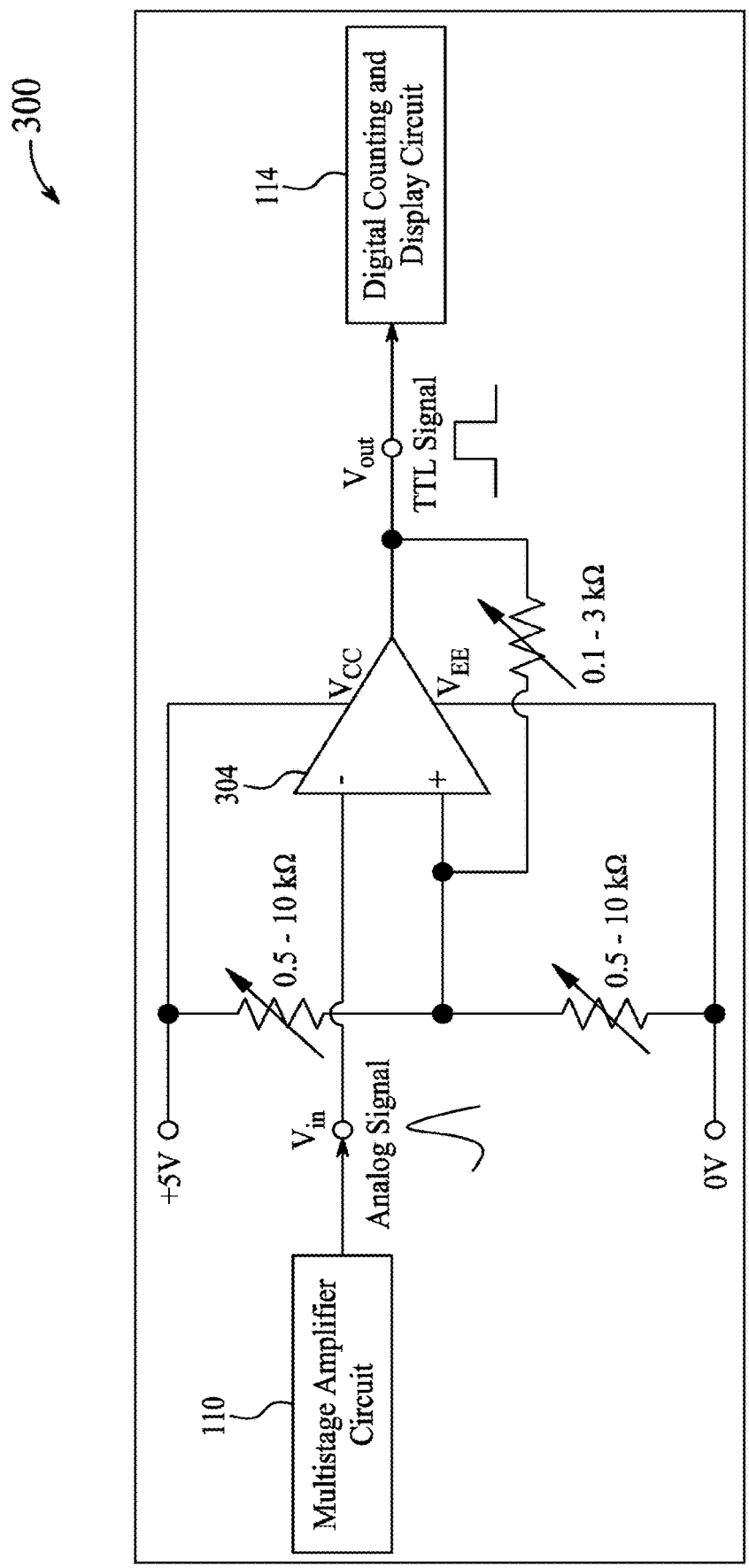
FIG. 3 represents a circuit diagram of a Schmitt trigger circuit, according to aspects of the present disclosure.

FIG. 3 represents a circuit diagram of the A/D converter 112, according to aspects of the present disclosure. In an example, the A/D converter 112 is implemented using a Schmitt trigger circuit 300. The Schmitt trigger circuit 300 is configured to receive an output signal ($V_{in}$, analog signal as shown) of the low noise multistage amplifier 110 and generate a signal ($V_{out}$, TTL signal as shown) that is compatible with the digital counting and display circuit 114, that is, matching the TTL input levels. The output signal, $V_{in}$, is the series of linearly changing amplified voltage signals. The signal, $V_{out}$, is the series of digital voltage signals. The output signal has abrupt transitions. The Schmitt trigger circuit 300 is a comparator circuit that uses positive feedback for implementing delayed action and is also used to remove noise from an analog signal while converting the analog signal to a digital signal. The Schmitt trigger circuit 300 is a threshold level-detecting circuit with hysteresis using a fast comparator (operational amplifier) 304 with positive feedback and a voltage reference. The Schmitt trigger circuit 300 includes an operational amplifier 304 having an inverting input connected to the low noise multistage amplifier 110, and a non-inverting input connected to a voltage reference signal and a feedback path from an output of the operational amplifier, where the feedback path includes a variable resistor (shown as 0.1-3 kΩ). The Schmitt trigger circuit 300 receives the series of linearly changing amplified voltage signals and generates the series of digital voltage signals. The series of digital voltage signals generated by the Schmitt trigger circuit 300 is compatible with the subsequent digital counting and display circuit 114. The series of digital voltage signals generated by the Schmitt trigger circuit 300 match the transistor-transistor logic (TTL) input levels. The series of digital voltage signals may have abrupt transitions. The output of the Schmitt trigger circuit 300, by switching between high voltage (high saturation threshold limit) and low voltage (low saturation threshold limit), generates a series of output signals (pulses) with abrupt (sharp and jitter free) transitions from a series linearly changing input pulses (slow rise and fall times with jitter). The amplitude of the generated TTL pulses is between 0 V and 5 V, which corresponds to "low logic level or logic level 0" and "high logic level or logic level 1" for TTL digital electronics, respectively. In an example, the Schmitt trigger circuit 300 is based on the integrated circuit (for example, LM318 manufactured by Texas Instruments Dallas, TX, USA 75243) or the Schmitt trigger circuit 300 may be constructed using the integrated circuit (LM555 timer, Texas Instruments Dallas, TX, USA 75243).

Figure 4:
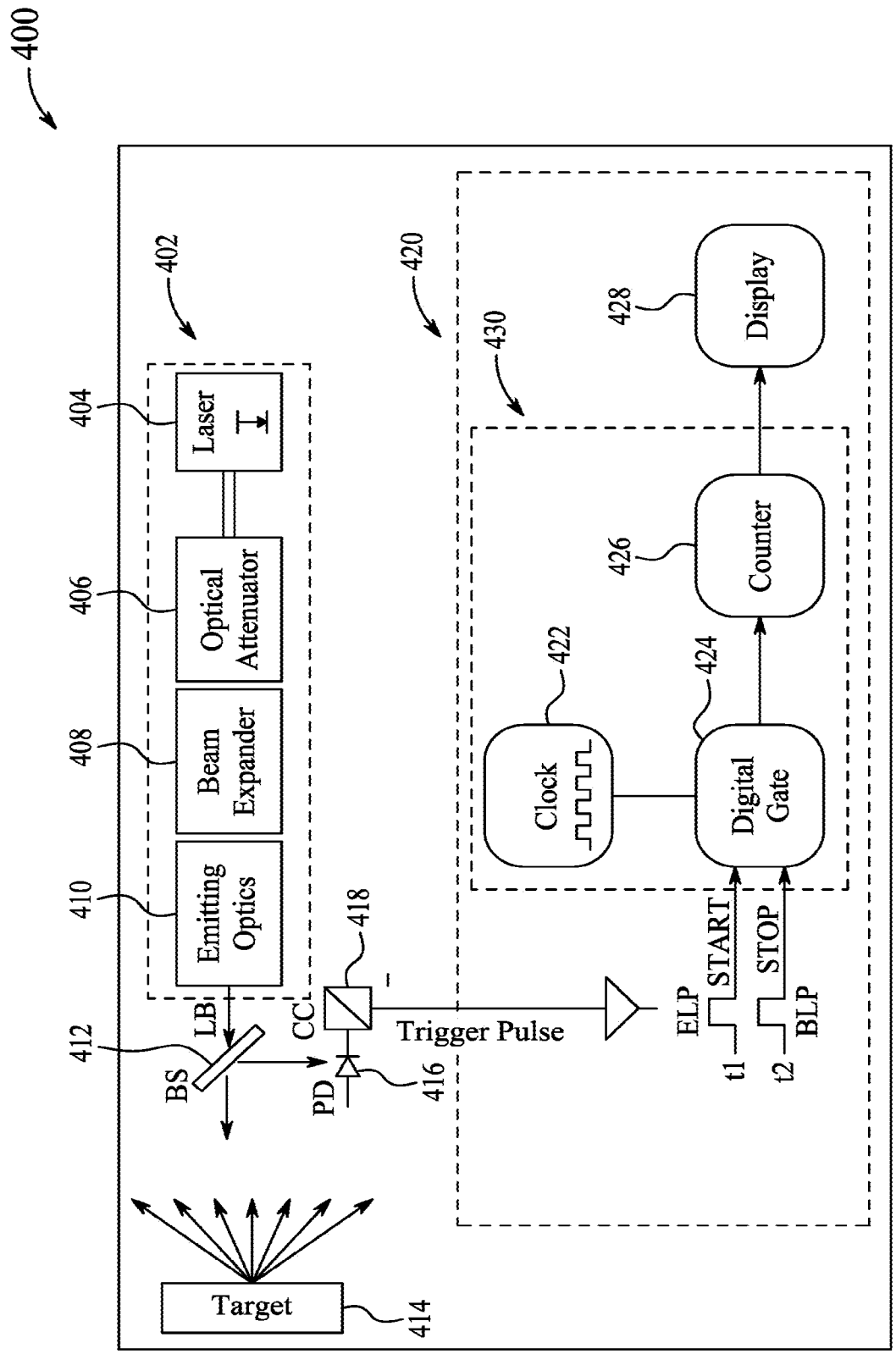
FIG. 4 illustrates an architecture of a schematic diagram of transmitting optics, and a digital counting and display circuit of the laser rangefinder, according to aspects of the present disclosure.

FIG. 4 illustrates an architecture of a schematic diagram of a transmitting optics 402 and a digital counting and display circuit 420, 114 of a laser rangefinder 400, according to aspects of the present disclosure. As shown in FIG. 4, the laser rangefinder 400 includes the transmitting optics 402, the optoelectronic detection circuit (not shown), and the digital counting and display circuit 420. The digital counting and display circuit 420 is similar to the digital counting and display circuit 114 shown in FIG. 1. The transmitting optics 402 is configured to transmit the pulsed laser beam toward a target 414 (substantially similar to the target 104). The optoelectronic detection circuit is configured to collect backscattered laser signals, reflected from the target 414, and generate the focused backscattered laser signal. The digital counting and display circuit 420 is configured to calculate the distance between the laser 102 and the target 414, 104. The digital counting and display circuit 420 is configured to display the calculated distance on a display 428.

In an example, the transmitting optics 402 includes a laser 404 (substantially similar to laser 102 of FIG. 1), an optical attenuator 406, a beam expander 408, an emitting optics 410, and a beam splitter 412.

The laser 404 is configured to emit the pulsed laser beam. In an example, the laser 404, 102 includes a neodymium-doped yttrium aluminum garnet (Nd:YAG) laser, an optical attenuator, a collimator, and a diffuser. The Nd:YAG laser 404 is configured to generate the pulsed laser beam in the near-infrared spectral region at the wavelength of 1.06 μm.

The optical attenuator 406 is coupled to the laser 404 for receiving the pulsed laser beam. The optical attenuator 406 is configured to attenuate the power (intensity) of the pulsed laser beam emerging from the laser 404, 102. The optical attenuator 406 may be used in fiber-optic communications to test power level margins by temporarily adding a calibrated amount of signal loss, or installed permanently to match transmitter and receiver levels.

The beam expander 408 is configured to receive the attenuated pulsed laser beam from the optical attenuator 406. The beam expander 408 is used for increasing or decreasing the diameter of the received pulsed laser beam. In an example, the beam expander 408 is a Keplerian beam expander or a Gallilean beam expander. In an example, a Gallilean beam expander is configured to reduce divergence of the each of the series of received pulsed laser beams. The Gallilean beam expander is used to reduce the laser beam divergence to about 0.1 mrad, resulting in a collimated and circular pulsed laser beam with a diameter of about 15 mm. The Gallilean beam expander increases the diameter of a collimated input beam to a larger collimated output beam. In an example, the Gallilean type beam expander provides 5 times magnification.

The emitting optics 410 is configured to receive the collimated and circular pulsed laser beam from the beam expander 408 and emit the pulsed laser beam towards the target 414 via the beam splitter 412. The beam splitter 412 is configured to receive the pulsed laser beam, pass a first portion of the pulsed received laser beam through the beam splitter 412 towards the target 414, and pass a second portion of the pulsed laser beam at a 90° angle. In an example, the second portion of the laser beam is a small fraction of the first portion of the pulsed laser beam.

In an example, the emitting optics 410 includes an optical diffuser for controlling the intensity distribution of the pulsed laser beam. In some examples, the emitting optics 410 includes a collimator for reducing dispersing and increasing laser beam collimation transmission range and a diffuser. The collimator is commutatively coupled with the Gallilean beam expander 408 and receives the collimated laser beam from the Gallilean beam expander. The collimator is configured to generate an expanded laser beam. In an example, the collimator is configured to change the direction of the received laser beam to align the laser beam in a specific direction or to cause the spatial cross section of the laser beam to become smaller. The collimator is configured to reduce dispersing, to increase a range of laser beam collimation transmission, and to increase a size of laser beam diameter. The diffuser is configured to control of the intensity distribution of the laser beam. In an example, the diffuser is configured to homogenize the expanded laser beam to produce an output beam with uniform intensity distribution.

In operation, a photodiode 416 is configured to receive the second portion of the pulsed laser beam diverted by the beam splitter 412. The photodiode 416 converts the received second portion of the pulsed laser beam to a second portion pulsed current signal. In an example, the photodiode 416 is a high speed silicon photodiode (substantially similar to the silicon avalanche photodetector 108).

The converter circuit 418 is connected to the photodiode 416 and receives the second portion pulsed current signal. In an example, the converter circuit 418 includes an analog to transistor-transistor logic (TTL) converter circuit. The converter circuit 418 is configured to convert the portion pulsed current signal to a pulsed TTL signal. The emitted pulsed laser beam reflected from the target 414 and then received back at the optoelectronic detection circuit, as shown similarly in the FIG. 1.

The digital counting and display circuit 420 includes a clock 422, a digital gate 424, a counter 426, and a display 428. The digital counting and display circuit 420 is configured to receive pulsed TTL signal from the converter circuit 418. The digital counting and display circuit 420, 114 receives the digital voltage signal from the A/D converter 112.

The clock 422 is configured to generate a clock signal. The clock 422 is the source of the pulse repetition frequency (PRF) of the laser rangefinder, that is, the internal timer of the laser rangefinder generates high-frequency constant pulses. The clock frequency is independent of the repetition rate of the laser 404 (laser emitter). The digital gate 424 is configured to unlock upon receiving each pulsed TTL signal and lock upon receiving each digital voltage signal.

The pulses generated by the internal timer, which are square wave signals with 50% duty cycle, pass to the counter 426 through the digital gate 424, which is unlocked by the emitted laser pulse (ELP) and locked by the backscattered laser pulses (BLP). The counter 426 is configured to count the pulsed TTL signals received from the converter circuit 418 and calculate a distance between the laser and a target based on a time difference between each TTL signal and each corresponding digital voltage signal. The counter 426 converts the elapsed time between the ELP and the BLP to distance based on counting the number of clock pulses passing through the digital gate like a time-to-digital converter (TDC), which is displayed by the display 428 of the digital counting and display circuit 420. The display 428 displays the distance between the laser and the target.

Figure 5:
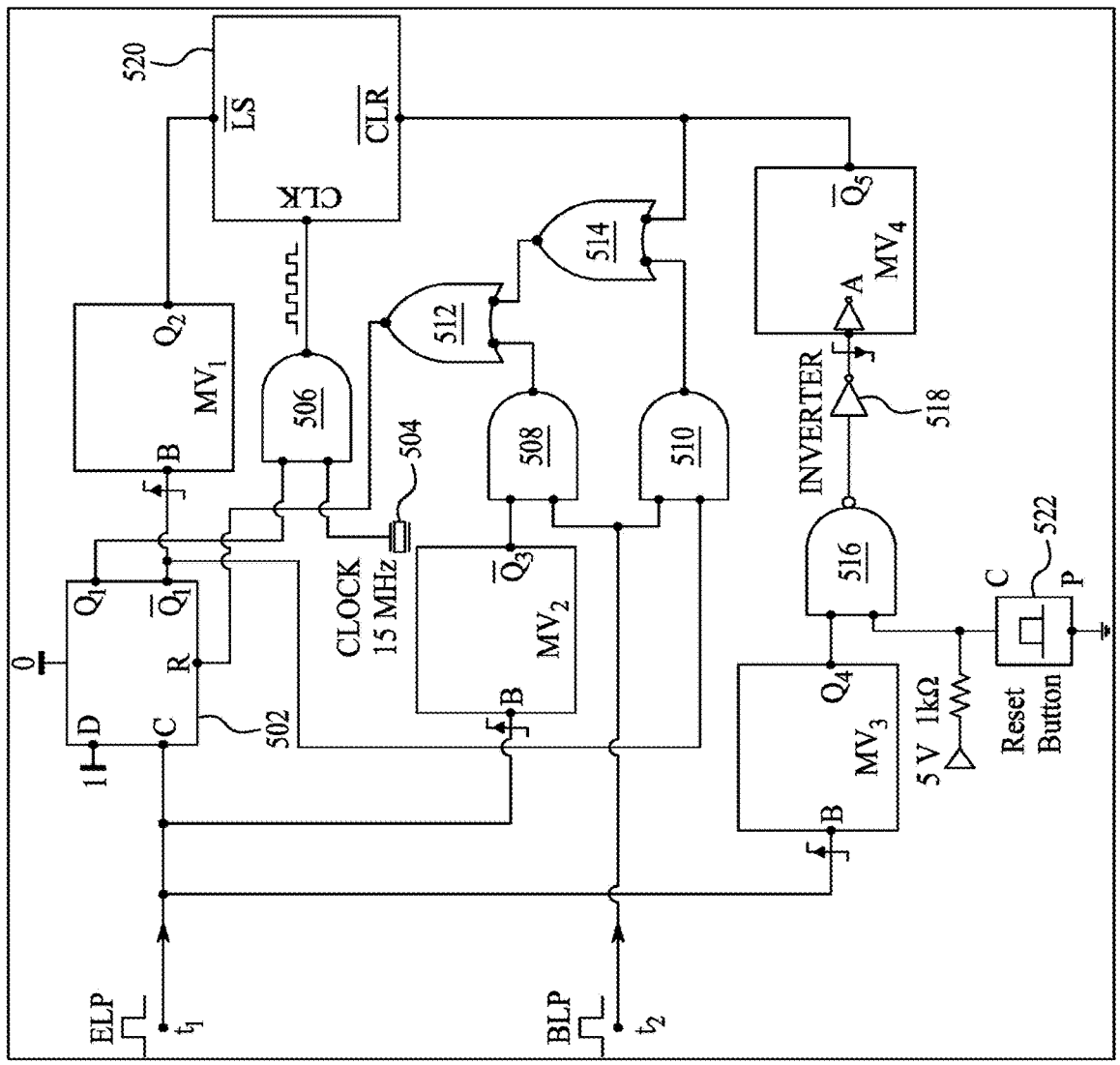
FIG. 5 illustrates a circuit diagram of the digital counting and display circuit, according to aspects of the present disclosure.

FIG. 5 illustrates a circuit diagram of the display counting and display circuit 500, according to aspects of the present disclosure.

The digital counting and display circuit 500 includes a digital gate 502, a clock 504, four monostable multivibrators ($MV_1$, $MV_2$, $MV_3$, $MV_4$), three AND gates (506, 508, 510), two OR gates (512, 514), a NAND gate 516, an inverter 518, a counter 520, a reset button 522, and a display (not shown). The digital counting and display circuit 500 is configured to receive the digital voltage signal from the A/D converter 112.

As shown in FIG. 5, the digital gate 502 is a D flip flop integrated circuit (hereinafter alternatively referred to as the D flip flop integrated circuit 502), connected to the first monostable multivibrator $MV_1$. The D flip flop integrated circuit 502 includes a trigger input, C, a data input, D, a set input, 0, a reset input, R, a first output, $Q_1$, and a second output, $\overline{Q_1}$. The trigger input, C, is configured to receive the TTL signal (for example, the ELP signal). The data input, D, is set to one volt. The second output, $\overline{Q_1}$ is connected to the first monostable multivibrator, $MV_1$.

At time $t_1$, a small fraction, in the range 1% to 3%, of the emitted laser pulse is used to start the counter 520. In an example, the counter 520 is TIL306 chip (manufactured by Texas Instruments Dallas, TX, USA 75243). In an example, the counter 520 includes a TTL integrated circuit which includes the display, a clock input, CLK, a latch strobe, $\overline{LS}$, input, and a clear input, $\overline{CLR}$. The TIL306 chip is a solid-state display with an integrated TTL Medium-Scale Integration (MSI) chip and an internal counter, latch, decoder, and driver. The TIL306 chip incorporates internally-driven seven-segment light-emitting-diode (LED) displays, which may be interconnected to produce an n-digit display. The internal counter runs at a frequency of 30 MHz leading to a distance resolution of ±5 m.

A trigger pulse (pulsed TTL signal), at time $t_1$, switches the output $Q_1$ of the D flip flop integrated circuit 502 to logic level "1" and hence allows the clock pulses to pass to the counter 520. In this process, each positive transition (rising edge) of each pulse increments the counter 520. The clock 504 is a quartz crystal oscillator with a stable output frequency of $(15 \times 10^6 \pm 0.15)$ Hz. Timing jitter is a deviation of a digital signal at a particular time relative to its ideal position. For example, a small clock timing jitter is a variation of the period between adjacent periods that accumulates with each clock cycle. By using short laser pulses from picosecond or femtosecond laser sources, the small clock timing jitter is reduced as the timing jitter is inversely proportional to the slope of the timing pulses of the ELP and BLP. Thus, the display counting and display circuit 500 ensures high accuracy and precision of the measurements. The accuracy and precision of the measurement of the distance to the target increases as the clock frequency increases. The frequency of 15 MHz is configured to meet the accuracy and precision of the laser rangefinder 100. On the other hand, the error in the time measurement, which is proportional to the number of clock periods measured, affects the precision and, to a lesser extent, the accuracy of the measurement, increases with the increase in the distance to be measured. The latch strobe input ($\overline{LS}$) of the counter 520, which is at logic level "0", allows the data in the latch outputs of TIL306 to follow the data in the counter and permits direct internal coupling between the counter and the display of TIL306.

At time $t_2$, the backscattered laser pulses resets $MV_1$ and therefore stops the clock pulses from passing to the counter 520. The output $Q_2$ of $MV_1$ switches now to logic level "1" and hence the latch strobe input of the counter 520 also receives to logic level "1" allowing the display of the distance corresponding to the time $t_2-t_1$. This high logic level is maintained unchanged for a predetermined time (≥1 s) using the monostable multivibrator $MV_2$. At this logic level, the data in the latch outputs of TIL306 are held constant, and the counter 520 may be operated independently. The digital counting and display circuit 500 is reset by the monostable multivibrator $MV_3$ and the monostable multivibrator $MV_4$ by pressing the reset button 522. To reduce false alarm signals from near field measurements, the monostable multivibrator $MV_2$ is used as a variable blanking device. The blanking device sets a blind zone of the laser rangefinder 100, below which any backscattered laser pulse is ignored by the circuit. This blanking time may be reduced if smaller distances are to be measured. In an example, a fast shutter may be employed to block near-field scattering may also be used within the afocal Gallilean telescope.

The digital counting and display circuit 500 receives a pulsed TTL signal by the digital gate 502. An input latch strobe, $\overline{LS}$, is connected to an output, $Q_2$, of a first monostable multivibrator $MV_1$. The TTL signal is provided to an input of a second monostable multivibrator $MV_2$ and to an input of a third monostable multivibrator $MV_3$.

A first AND 506 gate is configured to receive a first input from a first output, $Q_1$, of the D flip flop integrated circuit 502, and receive a second input from the clock 504. An output of the first AND gate 506 is connected to a clock input, CLK, of the TTL integrated circuit of the counter 520.

An output, $\overline{Q_3}$, of the second monostable multivibrator, $MV_2$, is connected to a first input of the second AND gate 508. A second input of the second AND gate 508 is connected to the digital voltage signal (BLP). An output of the second AND gate is connected to a first input of a first OR gate 512.

A third AND gate 510 is configured to connect to the digital voltage signal as a first input. Another second input of the third AND gate 510 is connected to the second output, $\overline{Q_1}$, of the D flip flop integrated circuit 502. An output of the third AND gate is connected to first input of the second OR gate 514. A second input of the first OR gate 512 is connected to an output of the second OR gate 514. An output of the first OR gate 512 connected to the reset input of the D flip flop integrated circuit 502. A second input of the second OR gate 514 is connected to the clear input, $\overline{CLR}$, of the counter 520. A second input of the second OR gate 514 is connected to an output, $\overline{Q_5}$, of the fourth monostable vibrator, $MV_4$. A first input of a NAND gate 516 is connected to an output, $Q_4$, of the fourth monostable multivibrator $MV_4$. Further, a second input of the NAND gate 516 is connected to the reset button 522. The reset button 522 is configured to deliver a five milli ampere pulse when the reset button 522 is pressed. In an example, 5 volts power is configured to pass through 1 k ohm resistor to provide a power supply to the reset button 522. The inverter 518 is connected to an output of the NAND gate 516. The fourth monostable vibrator $MV_4$ is connected to the inverter 518. The fourth monostable multivibrator $MV_4$ causes reset when the reset button 522 is pressed, providing 5 volt power to the NAND gate 516 and when $Q_4$ is also logic one due to the TTL input at the NAND gate 516. The fourth monostable multivibrator $MV_4$ generates an output, $\overline{Q_5}$ which is input to the clear input, $\overline{CLR}$ resetting the TTL integrated circuit of the counter 520. Also, the output, $\overline{Q_5}$ triggers the second OR gate 514 to generate a logic 1 signal that is given as an input to the first OR gate 512 when the output of the third AND gate 510 is also logic 1. The first OR gate 512 generates a logic 1 signal when the second AND gate 508 generates a logic 1 signal based on output $\overline{Q_3}$ of the second monostable vibrator, $MV_2$ and BLP. The positive signal from the first OR gate 512 is given to the R (reset) of the D flip flop integrated circuit 502, resetting the D flip flop integrated circuit 502. The display, integrated with the TIL306, is configured to display the distance between the laser and the target. In an example, the display includes a plurality of seven segment light-emitting-diode, LED, displays.

As shown in FIG. 5, the digital counting and display circuit 500 receives the pulsed TTL signal by the digital gate 502. The counter 520 of the digital counting and display circuit 500 is configured to be incremented on receiving each pulsed TTL signal. The digital counting and display circuit 500 determines a time difference between receiving the digital voltage signal and receiving the pulsed TTL signal.

The digital counting and display circuit 500 calculates a distance between the laser and the target based on the time difference and the counter 520. The digital counting and display circuit 500 displays the distance between the laser and the target on the display of the digital gate of the digital counting and display circuit 500.

The digital counting and display circuit 500 is configured to be employed using a small number of electronic components, facilitating its replication and also its maintenance in the event of failure. The digital counting and display circuit 500 offers various advantages such as compactness and lightness, thereby useful for small portable systems. Furthermore, the digital counting and display circuit 500 is a versatile, and easy to modify to meet custom requirements. In an example, the digital counting and display circuit 500 is not exclusive to laser rangefinders but may also be used in many other applications. On the other hand, features such as compactness and versatility make the circuit very competitive compared to the commercial circuits that are expensive and have a complicated design.

To evaluate the performance of the digital counting and display circuit 500, real measurements were performed. The circuit was integrated into the optoelectronic detection circuit of the laser rangefinder 100, and measurements were performed in open air using horizontal laser shots emitted in the direction of the targets. In the performed tests, solid targets situated at distances up to 15000 m along the line of sight of the laser 102 and having different reflectivity were measured with high accuracy and precision. The measurements were realized with a resolution of 5 m, an of ±1.5 m, and with a probability of detection (PD) of 0.99 and a probability of false alarm (PFA) of $1.5 \times 10^{-7}$. The PD is the probability that a laser echo from the target is considered by the detection system, while the PFA is the probability that a false laser echo is considered by the optoelectronic detection circuit. The measurements were validated using an existing commercial laser rangefinder. The maximum range may be improved by increasing the power of the emitted laser pulse, while the resolution may be enhanced by using internal counters running at frequencies higher than 30 MHz. Even though the accuracy of the measurements may be improved using a long averaging time, good accuracy of the measurements when using a single laser shot is important to reduce the number of averaged pulses (signal averaging), which leads to a short measurement time. There are many ways to improve single laser shot measurement, such as increasing the laser emitter repetition rate and using shorter laser pulses.

Figure 6:
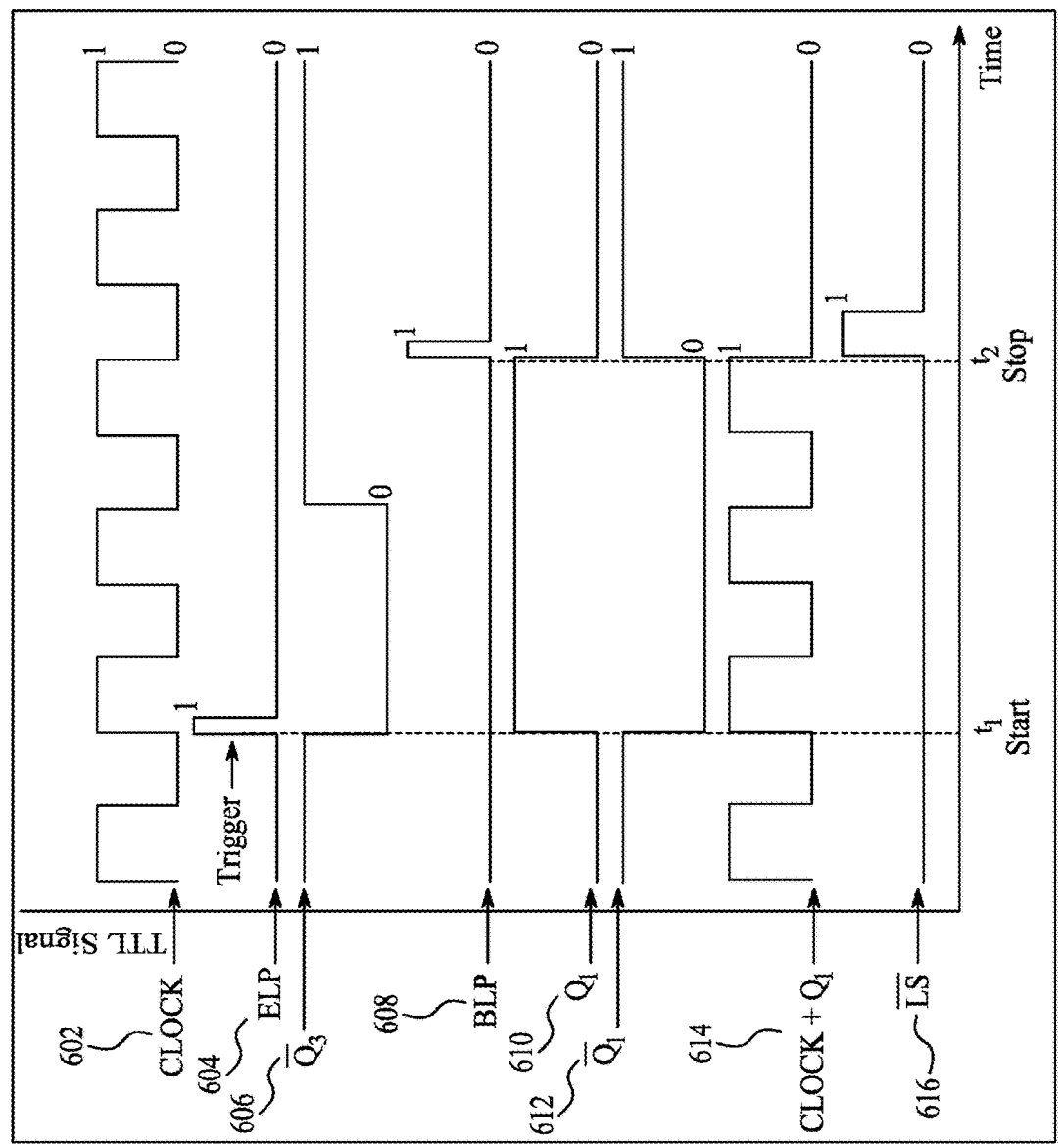
FIG. 6 illustrates a timing diagram of the counting and display circuit, according to aspects of the present disclosure.

FIG. 6 illustrates a timing diagram (600) of the counting and display circuit, according to aspects of the present disclosure.

As shown in FIG. 6, a clock 602 is a source of the pulse repetition frequency (PRF) of the laser rangefinder 100, that is, the internal time base of the laser rangefinder. The clock 602 generates high-frequency constant pulses. The clock frequency is independent of the repetition rate of the laser 102.

Further, the emitted laser pulse (ELP) 604 and backscattered laser pulses (BLP) 608 is shown in FIG. 6. The pulses are generated by the clock 602, which are square wave signals with 50% duty cycle. The generated pulses are configured to pass to the counter through the digital gate, which is unlocked by the ELP and locked by the BLP. The counter converts the elapsed time between the ELP and the BLP to distance based on counting the number of clock pulses passing through the digital gate like a time-to-digital converter (TDC), which is displayed by the display of the unit.

When the digital gate is unlocked by the ELP, $\overline{Q_3}$ (606) is an output of the second monostable multivibrator $MV_2$. When the digital gate is locked by the BLP, $Q_1$ (610) is an output of the D flip flop integrated circuit. $\overline{Q_1}$ (612) is an inverse of the $Q_1$ and acts as a second output. $\overline{Q_1}$ is connected to the first monostable multivibrator $MV_1$.

Further, signal 614 shows a clock that is a summation of the clock 602 and $Q_1$ (610).

Signal 616 represents a latch strobe $\overline{LS}$.

By using short laser pulses from picosecond or femtosecond laser sources, the timing jitter is reduced as the timing jitter is inversely proportional to the slope of the timing pulses ELP and BLP. The single laser shot measurement may be improved by optimizing the detection system bandwidth because the accuracy is affected by the time delay in the optoelectronic detection circuit.

Figure 7:
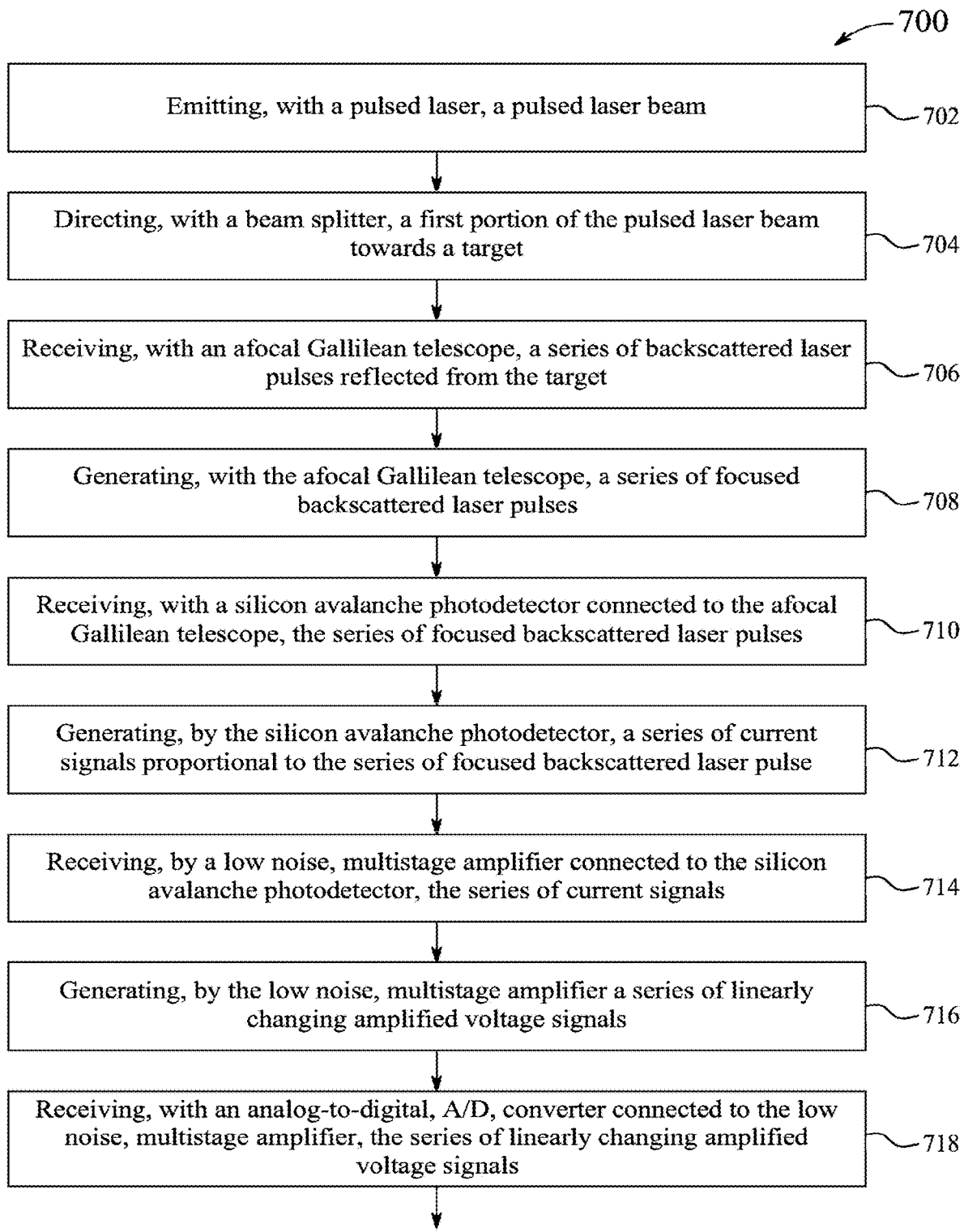
FIG. 7 illustrates a method of using the laser rangefinder, according to aspects of the present disclosure.
Figure 7:
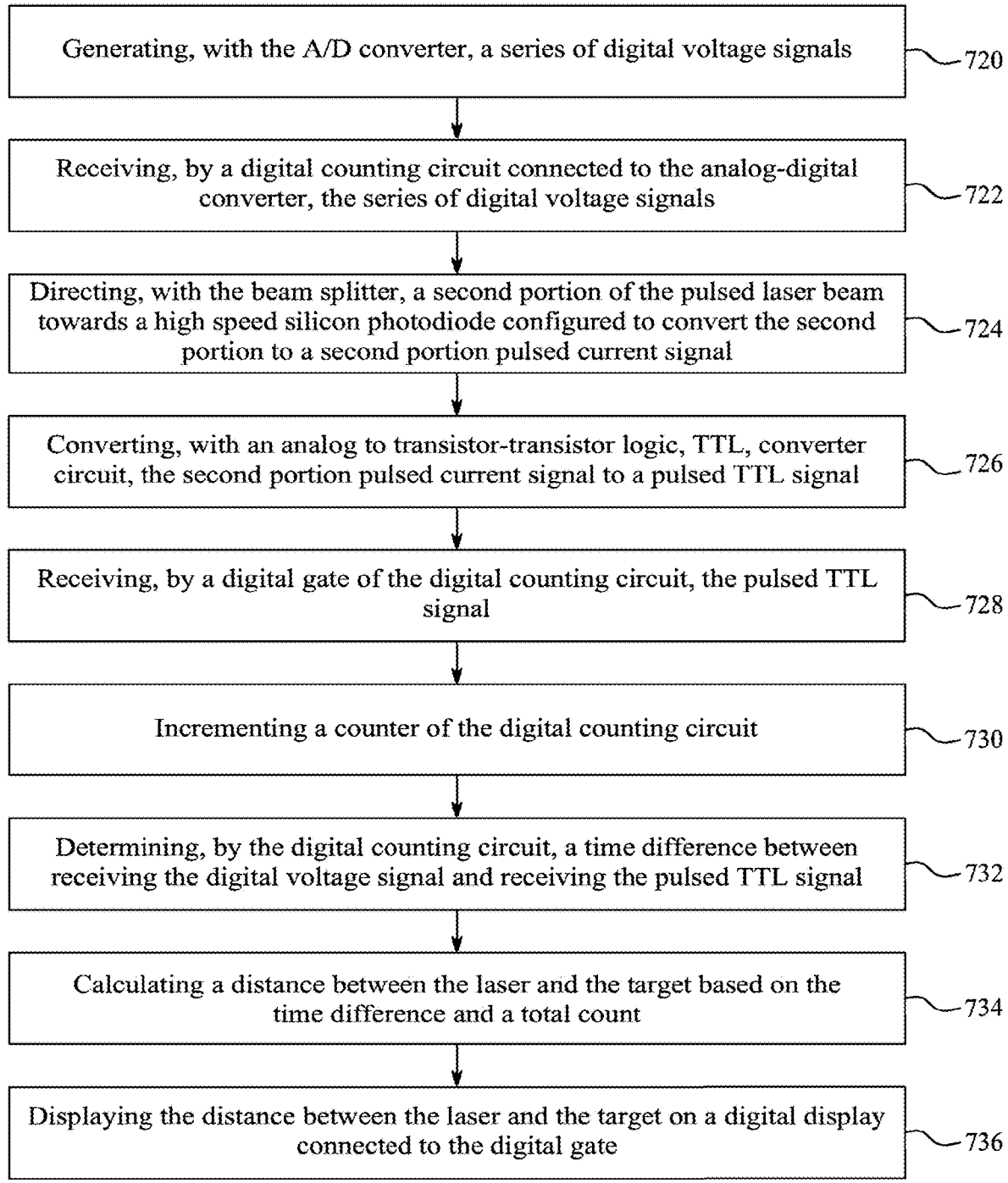

FIG. 7 illustrates a method 700 of using a laser rangefinder 100, according to aspects of the present disclosure. For the FIG. 7, FIG. 1 and FIG. 4 are to be seen in conjunction for viewing the flow of processing the pulsed lasers.

Step 702 includes emitting a pulsed laser beam with the pulsed laser 102. The pulsed laser beam is in the near-infrared spectral region at the wavelength of 1.06 μm.

Step 704 includes directing a first portion of the pulsed laser beam towards the target 104 with the beam splitter 412. In an example, the beam splitter 412 receives the pulsed laser beam from an emitting optics 410 and transmits a first portion of the received pulsed laser beam towards the target 104, 414.

Step 706 includes receiving backscattered laser pulses backscattered from the target 104 with an afocal Gallilean telescope 106. The laser 102 and the afocal Gallilean telescope 106 are mounted in a same plane in a monostatic biaxial configuration.

Step 708 includes generating, with the afocal Gallilean telescope 106, a series of focused backscattered laser pulses.

Step 710 includes receiving the series of focused backscattered laser pulses with the silicon avalanche photodetector 108 connected to the afocal Gallilean telescope 106.

Step 712 includes generating a series of current signals proportional to the focused backscattered laser pulses by the silicon avalanche photodetector 108.

Step 714 includes receiving the series of current signals by the low noise multistage amplifier 110 connected to the silicon avalanche photodetector 108.

Step 716 includes generating a series of linearly changing amplified voltage signals by the low noise multistage amplifier 110.

Step 718 includes receiving the series of linearly changing amplified voltage signals with an A/D converter 112 connected to the low noise multistage amplifier 110.

Step 720 includes generating a series of digital voltage signals with the A/D converter 112.

Step 722 includes receiving the series of digital voltage signals by the digital counting circuit 430 that is connected to the A/D converter 112.

Step 724 includes directing a second portion of the pulsed laser beam towards the high speed silicon photodiode 416 with the beam splitter 412. The high speed silicon photodiode 416 is configured to convert the second portion of the pulsed laser beam to a second portion pulsed current signal.

Step 726 includes converting the second portion pulsed current signal to a pulsed TTL signal with an analog to transistor-transistor logic (TTL) converter circuit 418.

Step 728 includes receiving the pulsed TTL signal by a digital gate 424 of the digital counting and display circuit 114.

Step 730 includes incrementing the counter 426 of the digital counting circuit 430.

Step 732 includes determining a time difference between receiving the digital voltage signal and receiving the pulsed TTL signal by the digital counting and display circuit 114.

Step 734 includes calculating the distance between the laser 102, 404 and the target 104, 414 based on the time difference and a counter total.

Step 736 includes displaying the distance between the laser and the target on a display of the digital gate of the digital counting and display circuit 114.

In an exemplary implementation, the method 700 includes unlocking a D flip flop of the digital gate when the pulsed TTL signal is received. Further, the method 700 includes locking the D flip flop when the digital voltage signal is received. The method 700 further includes clearing the counter 520 when a reset button 522 is pressed.

The first embodiment is illustrated with respect to FIGS. 1-7. The first embodiment describes the laser rangefinder 100. The laser rangefinder includes the laser 102 configured to emit a pulsed laser beam, the afocal Gallilean telescope 106 configured to receive backscattered laser pulses and generate a series of focused backscattered laser pulses, wherein the silicon avalanche photodetector 108 is connected to the afocal Gallilean telescope 106, wherein the silicon avalanche photodetector 108 is configured to generate series of current signals proportional to the series of focused backscattered laser pulses, a low noise multistage amplifier 110 is connected to the silicon avalanche photodetector, wherein the multistage amplifier is configured to generate a series of linearly changing amplified voltage signals from the series of current signals, an analog-to-digital, A/D, converter 112 connected to the low noise multistage amplifier 110, wherein the A/D converter 112 is configured to convert the series of linearly changing amplified voltage signal to a series of digital voltage signals, and the digital counting and display circuit 114 connected to the A/D converter 112, wherein the digital counting and display circuit 114 is configured to count each of the digital voltage signals, generate a total count and display the total count on a display.

The afocal Gallilean telescope 106 includes an achromatic convergent lens, a divergent lens, a biconvex lens configured to focus each backscattered laser pulse on the silicon avalanche photodetector 108, an interference filter configured to filter out ambient light, and an adjustable iris located in a focal plane of the afocal Gallilean telescope 106, the adjustable iris configured to correct a laser beam divergence.

The laser and the afocal Gallilean telescope 106 are mounted in a same plane in a monostatic biaxial configuration.

The low noise multistage amplifier 110 includes a low noise preamplifier configured to have a fixed gain, and a variable gain amplifier.

Further, the digital counting and display circuit 114 includes a DC offset correction circuit located within the low noise preamplifier, wherein the DC offset correction circuit is configured to remove distortions in the current signals.

The A/D converter 112 includes a high frequency Schmitt trigger circuit 300 configured to receive the series of linearly changing amplified voltage signals and generate the series of digital voltage signals, wherein the series of digital voltage signals have abrupt transitions.

The high frequency Schmitt trigger circuit 300 includes the operational amplifier 304 having an inverting input connected to the multistage amplifier and a non-inverting input connected to both a voltage reference signal and to a feedback path from an output of the operational amplifier, wherein the feedback path includes a variable resistor.

Further, the laser 102 includes a neodymium-doped yttrium aluminum garnet (Nd:YAG) laser configured to generate the pulsed laser beam, the optical attenuator 406 configured to attenuate a power of the pulsed laser beams, the Gallilean beam expander 408 configured to reduce a divergence of the each of the series of pulsed laser beams, a collimator, and a diffuser.

The laser 102 further includes the beam splitter 412 configured to receive the pulsed laser beam and a pass a first portion of the pulsed laser beam through the beam splitter and divert a second portion of the pulsed laser beam, where the second portion is a small fraction of the first portion, a high speed silicon photodiode 416 configured to receive the second portion and convert the second portion to a second portion pulsed current signal, and an analog to transistor-transistor logic (TTL) converter circuit 418 connected to receive the second portion pulsed current signal, wherein the analog to TTL converter circuit is configured to convert the portion pulsed current signal to a pulsed TTL signal.

The digital counting and display circuit 114 includes the digital gate 424 configured to unlock upon receiving each pulsed TTL signal and lock upon receiving each digital voltage signal; a clock configured to generate clock pulses; a counter configured to count the pulsed TTL signals and calculate a distance between the laser 102 and a target based on a time difference between each TTL signal and each corresponding digital voltage signal, the first monostable multivibrator, $MV_1$, the second monostable multivibrator, $MV_2$, the third monostable multivibrator, $MV_3$, and a fourth monostable multivibrator, $MV_4$; the first AND gate 506, the second AND gate 508, and the third AND gate 510; the first OR gate 512 and a second OR gate 514; a NAND gate; the inverter 518 coupled to an output of the NAND gate 516; the reset button 522; and the display 428 configured to display the distance between the laser 102 and the target 414.

The display 428 includes a plurality of seven segment light-emitting-diode (LED) displays.

The digital gate includes a D flip flop integrated circuit, $IC_1$ 502, connected to the first monostable multivibrator, ($MV_1$).

The D flip flop integrated circuit 502 includes a trigger input, C, configured to receive the TTL signal; a data input, D, set to one volt; a set input, 0, set to zero volts; a reset input; a first output, $Q_1$; and a second output, $\overline{Q_1}$, connected to the first monostable multivibrator, ($MV_1$).

The counter 426 includes a TTL integrated circuit 520 which includes the display, a clock input, CLK, a latch strobe, $\overline{LS}$, input, and a clear input, $\overline{CLR}$.

The digital counting and display circuit 114, including circuit connections having the latch strobe, $\overline{LS}$, input connected to an output, $Q_2$, of the first monostable multivibrator $MV_1$; the second monostable multivibrator input connected to the TTL input; the third monostable multivibrator input connected to the TTL input; the first AND gate having a first input connected to the first output, $Q_1$, of the D flip flop integrated circuit, a second input connected to the clock, and an output connected to the clock input, CLK, of the TTL integrated circuit; an output, $\overline{Q_3}$, of the second monostable multivibrator, $MV_2$, connected to a first input of the second AND gate; a second input of the second AND gate connected to the digital voltage signal; a first input of the third AND gate connected to the digital voltage signal; a second input of the third AND gate connected to the second output, $\overline{Q_1}$, of the D flip flop integrated circuit; an output of the second AND gate connected to a first input of the first OR gate; an output of the third AND gate connected to first input of the second OR gate; a second input of the first OR gate connected to an output of the second OR gate; a second input of the second OR gate connected to the clear input, $\overline{CLR}$, of the TTL integrated circuit; an output of the first OR gate connected to the reset input of the D flip flop integrated circuit; a first input of the NAND gate connected to an output, $Q_4$, of the fourth monostable multivibrator; a second input of the NAND gate connected to the reset button, wherein the reset button 522 is configured to deliver a five milliamp pulse when the reset button 522 is pressed; the inverter 518 connected to an output of the NAND gate 516; a fourth monostable vibrator $MV_4$ connected to the inverter 518; and a second input of the second OR gate 514 connected to an output, $\overline{Q_5}$, of the fourth monostable vibrator, $MV_4$.

The second embodiment is illustrated with respect to FIGS. 1-7. The second embodiment describes a method of using a laser rangefinder 100. The method includes emitting, with a pulsed laser 102, a pulsed laser beam; directing, with a beam splitter, a first portion of the pulsed laser beam towards a target 104, 414; receiving, with an afocal Gallilean telescope 106, a series of backscattered laser pulses reflected from the target 104; generating, with the afocal Gallilean telescope 106, a series of focused backscattered laser pulses; receiving, with the silicon avalanche photodetector 108 connected to the afocal Gallilean telescope 106, the series of focused backscattered laser pulses; generating, by the silicon avalanche photodetector 108, a series of current signals proportional to the series of focused backscattered laser pulses; receiving, by the low noise multistage amplifier 110 connected to the silicon avalanche photodetector 108, the series of current signals; generating, by the low noise multistage amplifier 110 a series of linearly changing amplified voltage signals; receiving, with the A/D converter 112 connected to the low noise multistage amplifier 110, series of linearly changing amplified voltage signals; generating, with the A/D converter 112, a series of digital voltage signals; receiving, by a digital counting circuit 430 connected to the A/D converter 112, the series of digital voltage signals; directing, with the beam splitter 412, a second portion of the pulsed laser beam towards a high speed silicon photodiode 416 configured to convert the second portion to a second portion pulsed current signal; converting, with an analog to transistor-transistor logic, TTL, converter circuit 418, the second portion pulsed current signal to a pulsed TTL signal; receiving, by a digital gate 424 of the digital counting circuit 430, the pulsed TTL signal; incrementing a counter 426 of the digital counting circuit 114; determining, by the digital counting circuit 430, a time difference between receiving the series of digital voltage signals and receiving the pulsed TTL signal; calculating a distance between the laser 102 and the target 104, 414 based on the time difference and the counter 426; and displaying the distance between the laser 102 and the target on a display of the digital gate 424.

The method further includes unlocking a D flip flop integrated circuit 502 of the digital gate when the pulsed TTL signal is received, and locking the D flip flop integrated circuit 502 when the digital voltage signal is received.

The method further includes clearing the counter when the reset button 522 is pressed.

The third embodiment is illustrated with respect to FIGS. 1-7. The third embodiment describes a non-transitory computer readable medium having instructions stored therein that, when executed by one or more processors, cause the one or more processors to perform a method of using a laser rangefinder. The method includes emitting, with a pulsed laser 102, a pulsed laser beam; directing, with a beam splitter, a first portion of the pulsed laser beam towards a target 104, 414; receiving, with an afocal Gallilean telescope 106, a series of backscattered laser pulses reflected from the target 104; generating, with the afocal Gallilean telescope 106, a series of focused backscattered laser pulses; receiving, with the silicon avalanche photodetector 108 connected to the afocal Gallilean telescope 106, the series of focused backscattered laser pulses; generating, by the silicon avalanche photodetector 108, a series of current signals proportional to the series of focused backscattered laser pulses; receiving, by the low noise multistage amplifier 110 connected to the silicon avalanche photodetector 108, the series of current signals; generating, by the low noise multistage amplifier 110 a series of linearly changing amplified voltage signals; receiving, with the A/D converter 112 connected to the low noise multistage amplifier 110, series of linearly changing amplified voltage signals; generating, with the A/D converter 112, a series of digital voltage signals; receiving, by a digital counting circuit 430 connected to the A/D converter 112, the series of digital voltage signals; directing, with the beam splitter 412, a second portion of the pulsed laser beam towards a high speed silicon photodiode 416 configured to convert the second portion to a second portion pulsed current signal; converting, with an analog to transistor-transistor logic, TTL, converter circuit 418, the second portion pulsed current signal to a pulsed TTL signal; receiving, by a digital gate 424 of the digital counting circuit 430, the pulsed TTL signal; incrementing a counter 426 of the digital counting circuit 114; determining, by the digital counting circuit 430, a time difference between receiving the series of digital voltage signals and receiving the pulsed TTL signal; calculating a distance between the laser 102 and the target 104, 414 based on the time difference and the counter 426; and displaying the distance between the laser 102 and the target on a display of the digital gate 424.

The non-transitory computer readable medium method further includes unlocking a D flip flop of the digital gate when the pulsed TTL signal is received; locking the D flip flop when the digital voltage signal is received; and clearing the counter when a reset button is pressed.

Although not depicted in the Drawings, the laser rangefinder 100 may include a signal processor that calculates the distance to the target using a phase difference between the pulsed laser beam emitted from the laser 102 and the light received by the afocal Gallilean telescope. The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A method for determining a distance with a laser rangefinder, comprising:
   emitting, with a pulsed laser, a pulsed laser beam;
   directing, with a beam splitter, a first portion of the pulsed laser beam towards a target;
   receiving, with an afocal Gallilean telescope, a series of backscattered laser pulses reflected from the target, wherein the Gallilean telescope comprises
      an achromatic convergent lens;
      a divergent lens;
      a biconvex lens;
      an interference filter; and an adjustable iris located in a focal plane of the afocal Gallilean telescope;

generating, with the afocal Gallilean telescope, a series of focused backscattered laser pulses;

receiving, with a silicon avalanche photodetector connected to the afocal Gallilean telescope, the series of focused backscattered laser pulses;

generating, by the silicon avalanche photodetector, a series of current signals proportional to the series of focused backscattered laser pulse;

receiving, by a low noise, multistage amplifier connected to the silicon avalanche photodetector, the series of current signals;

generating, by the low noise, multistage amplifier a series of linearly changing amplified voltage signals;

receiving, with an analog-to-digital, A/D, converter connected to the low noise, multistage amplifier, the series of linearly changing amplified voltage signals;

generating, with the A/D converter, a series of digital voltage signals;

receiving, by a digital counting circuit connected to the analog-digital converter, the series of digital voltage signals;

directing, with the beam splitter, a second portion of the pulsed laser beam towards a high speed silicon photodiode configured to convert the second portion to a second portion pulsed current signal;

converting, with an analog to transistor-transistor logic, TTL, converter circuit, the second portion pulsed current signal to a pulsed TTL signal;

receiving, by a digital gate of the digital counting circuit, the pulsed TTL signal;

incrementing a counter of the digital counting circuit;

determining, by the digital counting circuit, a time difference between receiving the series of digital voltage signals and receiving the pulsed TTL signal;

calculating a distance between the laser and the target based on the time difference and a counter total; and displaying the distance between the laser and the target on a digital display connected to the digital gate.

2. The method of claim 1, wherein the laser and the Gallilean telescope are mounted in a same plane in a monostatic biaxial configuration.

3. The method of claim 1, wherein the low noise multistage amplifier includes:
a low noise preamplifier configured to have a fixed gain; and
a variable gain amplifier.

4. The method of claim 1, wherein the analog-to-digital converter includes a high frequency Schmitt trigger circuit.

5. The method of claim 1, wherein the high frequency Schmitt trigger circuit includes an operational amplifier having an inverting input connected to the low noise multistage amplifier and a non-inverting input connected to both a voltage reference signal and to a feedback path from an output of the operational amplifier, wherein the feedback path includes a variable resistor.

6. The method of claim 1, wherein the digital display includes a plurality of seven segment light-emitting-diode, LED, displays.

7. The method of claim 1, wherein the digital gate comprises:
a D flip flop integrated circuit, connected to the first monostable multivibrator, ($MV_1$).

8. The method of claim 7, wherein the D flip flop integrated circuit includes:
a trigger input, C, configured to receive the TTL signal;
a data input, D, set to one volt;
a set input, 0, set to zero volts;
a reset input;
a first output, Q1; and
a second output, $\overline{Q_1}$, connected to the first monostable multivibrator, ($MV_1$).

9. The method of claim 8, wherein the counter comprises:
a TTL integrated circuit which includes the display, a clock input, CLK, a latch strobe, $\overline{LS}$, input, and a clear input, $\overline{CLR}$.

10. The method of claim 1, comprising:
unlocking a D flip flop of the digital gate when the pulsed TTL signal is received; and
locking the D flip flop when the digital voltage signal is received.

11. The method of claim 1, comprising:
clearing the counter when a reset button is pressed.

* * * * *